(12) United States Patent
Dupraz

(10) Patent No.: US 11,049,670 B2
(45) Date of Patent: Jun. 29, 2021

(54) MECHATRONIC CIRCUIT-BREAKER DEVICE

(71) Applicant: General Electric Technology GmbH, Baden (CH)

(72) Inventor: Jean-Pierre Dupraz, Bressolles (FR)

(73) Assignee: General Electric Technology GmbH, Baden (CH)

( * ) Notice: Subject to any disclaimer, the term of this patent is extended or adjusted under 35 U.S.C. 154(b) by 487 days.

(21) Appl. No.: 15/767,796

(22) PCT Filed: Oct. 12, 2016

(86) PCT No.: PCT/EP2016/074513
§ 371 (c)(1),
(2) Date: Apr. 12, 2018

(87) PCT Pub. No.: WO2017/064144
PCT Pub. Date: Apr. 20, 2017

(65) Prior Publication Data
US 2018/0301295 A1    Oct. 18, 2018

(30) Foreign Application Priority Data

Oct. 13, 2015  (EP) ..................... 15189639

(51) Int. Cl.
| | |
|---|---|
| *H01H 9/54* | (2006.01) |
| *H02H 3/087* | (2006.01) |
| *H01H 33/59* | (2006.01) |
| *H02H 3/02* | (2006.01) |
| *H02H 9/04* | (2006.01) |
| *H02H 9/00* | (2006.01) |

(52) U.S. Cl.
CPC ............ *H01H 9/542* (2013.01); *H01H 9/548* (2013.01); *H01H 33/596* (2013.01);
(Continued)

(58) Field of Classification Search
CPC ............ H02H 3/02; H02H 3/021; H02H 3/08; H02H 3/087; H02H 9/001; H02H 9/04;
(Continued)

(56) References Cited

U.S. PATENT DOCUMENTS 10,475,600 B2 *  11/2019  Berard ................... H02H 7/222
2015/0002977 A1    1/2015  Dupraz et al.

FOREIGN PATENT DOCUMENTS

DE    10 2012 217 280 A1    3/2014
EP         0 867 998 A1        9/1998
(Continued)

OTHER PUBLICATIONS

Extended European Search Report and Opinion issued in connection with corresponding EP Application No. 15189639.6 dated Apr. 1, 2016.
(Continued)

*Primary Examiner* — Matthew V Nguyen
(74) *Attorney, Agent, or Firm* — Eversheds Sutherland (US) LLP

(57) ABSTRACT

The disclosure relates to a mechatronic circuit-breaker device adapted to break an electrical current flowing through electrical power transmission means, the device including a main branch comprising at least one electromechanical switch-disconnector connected in series with at least one breaker cell itself electrically in parallel with a snubber and a first voltage surge limiter; an auxiliary branch electrically in parallel with the main branch and comprising at least one power electronic switch, connected in series with at least one capacitor, itself electrically in parallel with its discharge resistance and a second voltage surge limiter. The first voltage surge limiter has a sharper voltage-current characteristic and offering a much steeper slope at low currents than the second surge limiter.

14 Claims, 2 Drawing Sheets

(52) U.S. Cl.
CPC ............ *H02H 3/021* (2013.01); *H02H 3/087* (2013.01); *H02H 9/04* (2013.01); *H01H 2009/543* (2013.01); *H01H 2009/544* (2013.01); *H02H 9/001* (2013.01)

(58) Field of Classification Search
CPC ........ H02H 9/043; H01H 9/542; H01H 9/548; H01H 33/596; H01H 2009/543; H01H 2009/544
See application file for complete search history.

(56) References Cited

FOREIGN PATENT DOCUMENTS

| | | | | |
|---|---|---|---|---|
| EP | 2 768 102 | A1 | 8/2014 | |
| EP | 2 795 645 | B1 | 2/2017 | |
| EP | 3373317 | A1 * | 9/2018 | ......... H01H 33/6661 |
| EP | 3429045 | A1 * | 1/2019 | ............... H02H 1/06 |
| WO | 2011/057675 | A1 | 5/2011 | |
| WO | 2013/071980 | A1 | 5/2013 | |
| WO | 2014/032692 | A1 | 3/2014 | |
| WO | 2014/048716 | A1 | 4/2014 | |
| WO | WO-2018162421 | A1 * | 9/2018 | ......... H01H 33/6661 |

OTHER PUBLICATIONS

International Search Report and Written Opinion issued in connection with corresponding PCT Application No. PCT/EP2016/074513 dated Nov. 30, 2016.
Intention to Grant issued in connection with corresponding EP Application No. 15189639.6 dated Dec. 5, 2017.
International Preliminary Report on Patentability issued in connection with corresponding PCT Application No. PCT/EP2016/074513 dated Apr. 17, 2018.

* cited by examiner

MECHATRONIC CIRCUIT-BREAKER DEVICE

FIELD OF THE INVENTION

The invention relates to a mechatronic circuit-breaker device.

The main target application of the invention is to breaking high direct currents in a transmission and/or distribution line, typically at peak-to-peak voltage levels exceeding 50 kilovolts (kV) (DC), up to 800 kV (DC) and beyond. The expression high-voltage direct current (HVDC) is commonly used for this field of application.

The invention may also be applied to breaking direct currents at lower peak-to-peak voltages, typically in the range 1 kV to 50 kV, or to breaking alternating currents.

BACKGROUND OF THE INVENTION

We consider the case of a DC circuit breaker comprising a branch with a fast switch (called the main branch) separating contacts (arc tubes, vacuum interrupters). The circuit breaker also comprises an auxiliary branch.

When a fault is detected on the power grid, the power flowing through the main branch switches to the auxiliary branch.

The general principle of such a circuit breaker is described in EP12,810269.6.

Document DE102012217280 A1 describes the principle of a high voltage DC circuit breaker, using vacuum interrupters in the main branch and IGBT semiconductor in the auxiliary branch.

This document details the switching to the semiconductor branch, without giving details about the current breaking in the main branch.

Document EP0867998 B1 describes the principle of a high-voltage DC circuit breaker consisting of IGBT semiconductor active components connected in series, surge protectors with components connected in parallel. This circuit breaker does not comprise electromechanical switch for switching and isolation of the high voltage, and the load current continuously flows through static IGBT components. One can assume that the flow of the main current in the static IGBT components is likely to cause heavy losses and heating.

Document WO 2013071980 A1 describes a high DC voltage circuit breaker and details more precisely a method of automatic disconnection of snubbers capacitor to prevent inadvertent discharge of the latter in the breaking switch of the main branch.

Document WO 2011057675 A1 describes the basic principle of a "hybrid" circuit breaker for DC network. The various power components and the breaking sequence are described.

These two documents do not detail the problem of the generation of arcs at the contacts of the switch of the main branch, due to the presence of a strong residual current in the main branch.

When a fault is detected on the power grid, the current of the main branch switches to the auxiliary branch. Three problems arise:

During switching, it must be avoided that a part of the current will be fed back into the main branch: for this, the voltage level generated by the auxiliary branch must stay permanently below the threshold voltage present in the main branch and this must be independent from the current value on a very wide current range up to several kilo amps.

After switching, voltage level imposed by the auxiliary branch should not induce in the main branch a current exceeding an acceptable level, so as to open the electrical contacts of the switch-disconnector at minimal arc levels that could degrade the contacts: degradation of surface states, decreasing the breakdown voltage, reducing the life of the vacuum interrupters.

The minimum voltage opposed by the device after switching should be kept as high as possible, in order to make faster the commutation towards other parts of the circuit-breaker when needed.

BRIEF DESCRIPTION OF THE INVENTION

The object of the invention is thus to propose a new mechatronic circuit-breaker device that alleviates some or all of the drawbacks of the prior art referred to above.

A particular object is to propose a DC circuit-breaker device able to minimize the current in its main branch, so as to produce a break without arc in this branch, or more exactly, with a very low energy arc, that would have no significant effect and could be neglected.

To this end, the invention provides a mechatronic circuit-breaker device adapted to break an electrical current flowing through electrical power transmission means, the device comprising:

a main branch comprising at least one electromechanical switch-disconnector connected in series with at least one breaker cell itself electrically in parallel with a snubber and a first voltage surge limiter;

an auxiliary branch electrically in parallel with the main branch and comprising at least one power electronic switch, connected in series with at least one capacitor, itself electrically in parallel with its discharge resistance and a second voltage surge limiter, characterized in that the first voltage surge limiter has a sharper voltage-current characteristic and offering a much steeper slope at low currents than the second surge limiter.

The power electronic switch is for example a thyristor.

Due to the invention, the residual current in the main branch is very low. Thus, the electromechanical switch-disconnector can be opened with minimum arc levels. Accordingly, the contacts of the electromechanical switch-disconnector don't deteriorate too quickly.

The minimum voltage opposed by the device after switching can be kept as high as possible. The first voltage surge limiter has highly nonlinear characteristics to fix the voltage of the main branch. Thus, the voltage of the main branch is always higher than the voltage of the auxiliary branch.

This avoids the commutation of current from the auxiliary branch back into the main branch, while the value of the current can vary over a wide range and reach values of several kilo amps.

According to a preferred characteristic, the first voltage surge limiter has a voltage-current characteristic $U_{103}(I_{103})$ that is approximated, in the operating area, with the relation:

$$\frac{U_{103}}{U_{a\_p}} = alpha\_p \sqrt{\frac{I_{103}}{I_{a\_p}}}$$

For $I_{103} > 0$

And $$\frac{U_{103}}{U_{a\_n}} = -\left[ alpha\_n \sqrt{\frac{-I_{103}}{I_{a\_n}}} \right]$$

For $I_{103} < 0$ where alpha_p, alpha_n, $U_{a\_p}$, $U_{a\_n}$, $I_{a\_p}$ and $I_{a\_n}$ are positive characteristic values for the first voltage surge limiter, the second voltage surge limiter has a voltage-current characteristic $U_{1124}(I_{1124})$ that is approximated, in the operating area, with the relation:

$$\frac{U_{1124}}{U_{b\_p}} = béta\_p \sqrt{\frac{I_{1124}}{I_{b\_p}}}$$

For $I_{1124} > 0$

And $$\frac{U_{1124}}{U_{b\_n}} = -\left[ béta\_n \sqrt{\frac{-I_{1124}}{I_{b\_n}}} \right]$$

For $I_{1124} < 0$ where béta_p, béta_n, $U_{b\_p}$, $U_{b\_n}$, $I_{b\_p}$ and $I_{b\_n}$ are positive characteristic values for the second voltage surge limiter, and the constant alpha_p is greater than the constants béta_p and béta_n.

Thus, the first voltage surge limiter, used in the main branch, has a voltage-current characteristic of much steeper slope and a sharper transition at low currents than the second surge limiter.

According to different embodiments, the constants alpha_p and alpha_n can be different, as similarly and respectively for béta_p and béta_n, Ua_p and Ua_n, Ia_p and Ia_n, Ub_p and Ub_n, Ib_p and Ib_n.

According to different embodiments, the constants béta_p and béta_n could be equal, as similarly and respectively for Ub_p and Ub_n, Ib_p and Ib_n, as this is the case for usual ZnO surge arrestors.

According to different embodiments, the constants alpha_p and/or alpha_n is/are greater than 30 or greater than 50 or greater than 100.

According to different embodiments, the constants beta_p and/or beta_n is/are in the range of 10 to 20 or in the range of 13 to 19 or is/are substantially equal to 17.

These values provide good results.

According to a preferred characteristic, the first voltage surge limiter is a semiconductor component of the type of power Zener diode, like "Transil diodes" and the second voltage surge limiter is a ZnO-type component.

These types of components have characteristic allowing the residual current in the main branch to remain very low when the circuit-breaker device breaks an electrical current.

BRIEF DESCRIPTION OF THE DRAWINGS

Other advantages and features of the invention become more clearly apparent on reading the detailed description given with reference to the following figures, in which.

DETAILED DESCRIPTION

Figure 1:
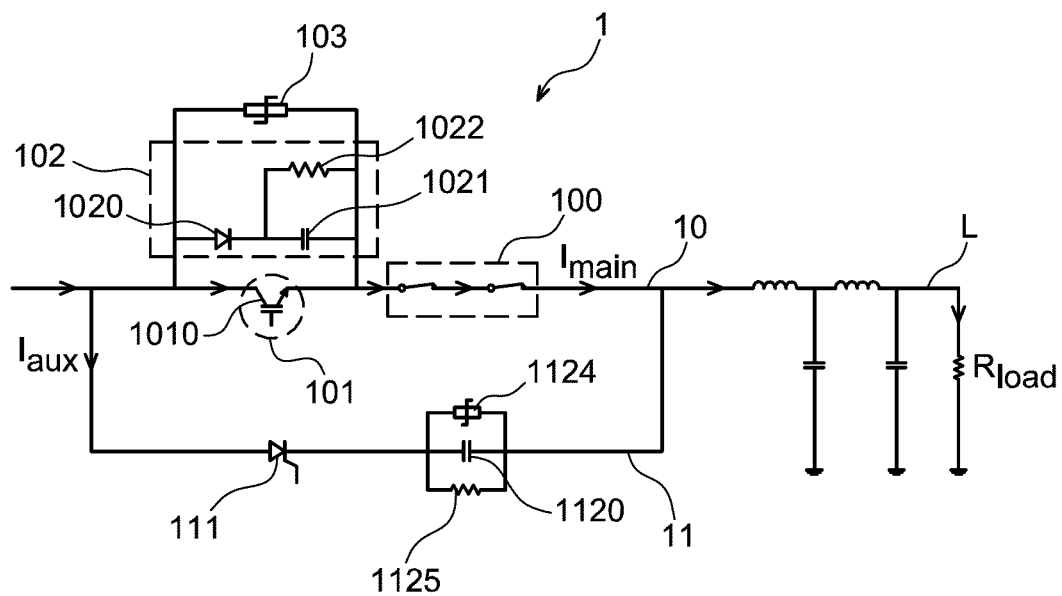
FIG. 1 shows an electrical architecture of a sub-part of a mechatronic circuit-breaker device according to an embodiment of the invention, with emphasis on the main and auxiliary branches.

FIG. 1 shows an electrical architecture of a sub-part of a mechatronic circuit-breaker device 1 according to an embodiment of the invention intended to break high direct currents in transmission networks L in a peak-to-peak voltage range up to 320 kV DC or more, with emphasis on the main and auxiliary branches.

Such a circuit-breaker device is well known of the person skilled in the art. Consequently, only components essential to the present invention are described here.

Such a device 1 comprises firstly a main branch 10 in which the primary current flows under steady conditions.

In parallel with the main branch 10 there is provided an auxiliary branch 11.

The main branch 10 comprises an electromechanical switch-disconnector 100 consisting of two vacuum interrupters (vacuum bottles), electrically in series with a breaker cell 101. This breaker cell 101 comprises at least one power electronic switch as for example an insulated gate bipolar transistor (IGBT) 1010. The main branch can comprise more than one electromechanical switch-disconnector, connected in series or in parallel, and more than one power electronic switch, connected in series or in parallel. Similarly, the electromechanical switch-disconnector 100 can be designed with a various number of vacuum interrupters, ore even with a various type of interrupters like gas interrupters.

Electrically in parallel with the breaker cell 101 is a snubber 102, limiting the rate of rise of voltage. The snubber is constituted of a diode 1020 electrically in series with a capacitor 1021, itself electrically in parallel with its discharge resistor 1022. The capacitor 1021 controls the rate of rise of the voltage at its terminals when the transistor 1010 is switched to the OFF state. The diode 1020 prevents violent discharging of the capacitor 1021 when the transistor 1010 begins to conduct. Finally, the resistor 1022 enables slow discharging of the capacitor 1021. Optionally, a resistor can be connected in parallel with the diode 1020, whenever a transient backward current is needed during the commutation. In other words, this voltage snubber 102 associated with the IGBT transistor 1010 protects the IGBT by controlling the rate at which the voltage across its terminals increases when it switches from the conducting (ON) state to the non-conducting (OFF) state.

Also electrically in parallel with the breaker cell 101 is a voltage surge limiter 103. It is designed to limit the voltage to a value less than the withstand voltage of the IGBT transistor 101. FIG. 1 and the description refer to one voltage surge limiter 103, but the invention is not limited to this case and also concerns a set of voltage surge limiters.

Figure 3:
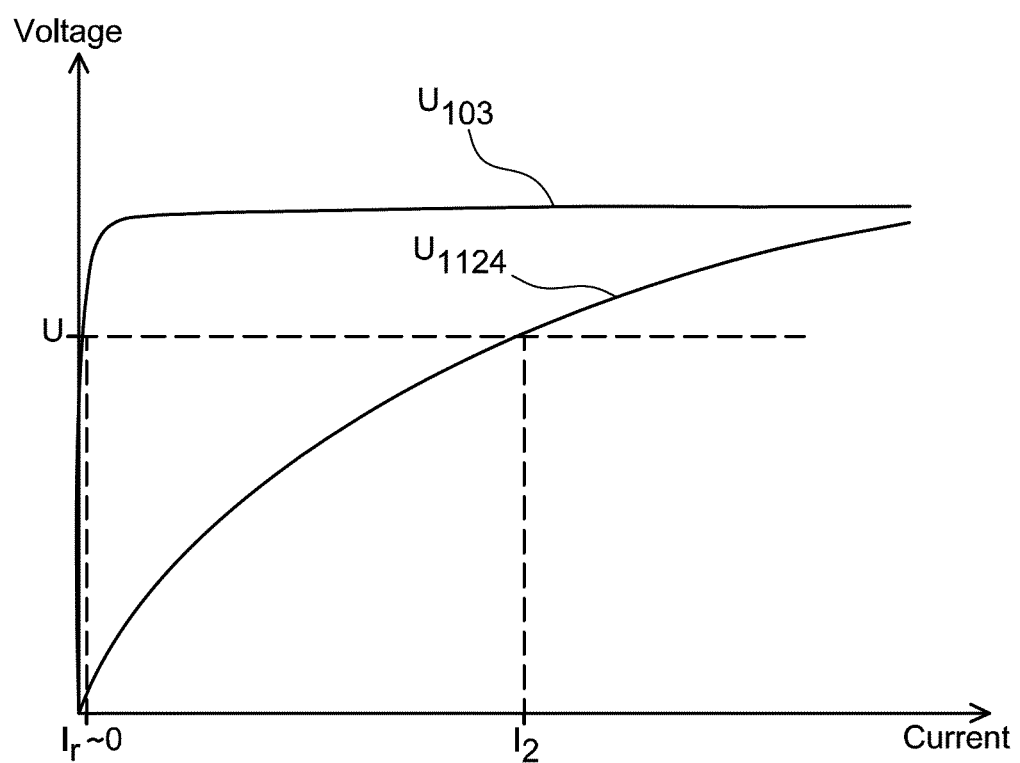
FIG. 3 shows the characteristic curves of the voltage in voltage surge limiters of the mechatronic circuit-breaker according to an embodiment of the invention, as a function of the current.

The voltage surge limiter 103 will be detailed with reference to FIG. 3 in the following.

The auxiliary branch 11 comprises a thyristor 111 or a plurality of power thyristors in cascade. FIG. 1 and the description refer to one thyristor 111, but the invention is not limited to this case and also concerns several power electronics components from other technologies connected in cascade.

The auxiliary branch 11 also comprises, electrically in series with the thyristor 111, a capacitor 1120, itself electrically in parallel with its discharge resistor 1125.

The capacitor 1120 may be associated with one or more inductors in series, as well as one or more resistors in series. These components are not shown in FIG. 1.

The capacitor 1120 and its discharge resistor 1125 are protected by an auxiliary voltage surge limiter 1124 connected electrically in parallel with them. This surge limiter 1124 is used as well as defining and limiting the voltage that appears at the terminals of the auxiliary branch 11 when the primary current flows.

In a preferred embodiment, the voltage surge limiter 1124 is a ZnO-type voltage surge limiter or is constituted of a set of ZnO-type surge limiters. FIG. 1 and the description refer to one voltage surge limiter 1124, but the invention is not limited to this case and also concerns a set of voltage surge limiters.

Note that FIG. 1 shows only a single electromechanical switch-disconnector 100 but in fact there may be a plurality of electromechanical switch-disconnectors connected in series or in parallel.

Note also that a power transistor as such is merely symbolically represented without showing its associated transfer capacitors and gate control device. The same holds for the power thyristor.

The operation of the mechatronic circuit-breaker device 1 is the following.

Under steady conditions, i.e. in normal operation of the network L, the transistor 1010 of the main branch is in the ON (conducting) state, and a current $I_{main}$ passes through it and in the main branch 10. The value of the current $I_{main}$ depends on a load $R_{load}$.

In the event of a fault occurring in the network L and being reflected by a current surge, the monitoring and control system (not shown) switches the transistor 1010 from its ON state to its OFF state. The current is then switched from the transistor 1010 to the diode 1020 and the capacitor 1021. The voltage across the capacitor 1021 rises until it reaches the threshold voltage of the voltage surge limiters 103 that becomes conducting and prevents further voltage rise.

Figure 2:
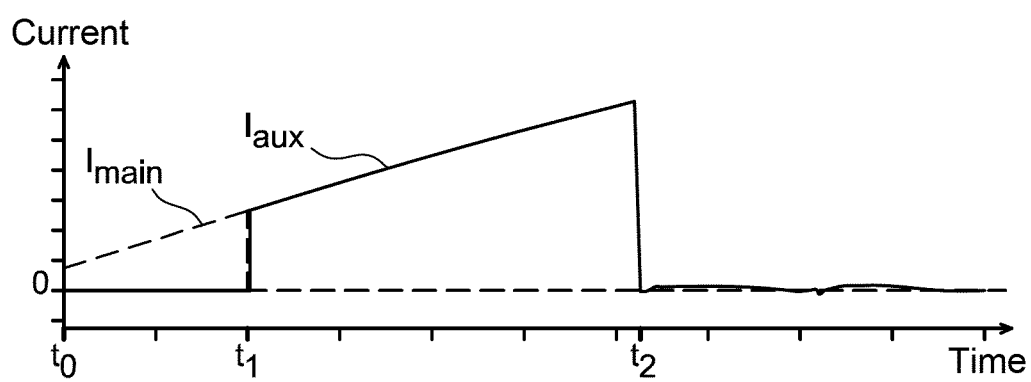
FIG. 2 shows curves representing the currents flowing respectively in main and auxiliary branches of the mechatronic circuit-breaker according to an embodiment of the invention, as functions of time.

FIG. 2 shows curves of the currents $I_{main}$ and $I_{aux}$ respectively in the main and auxiliary branches of the mechatronic circuit-breaker 1 as a function of time.

In case of a fault occurring at time t0, the current steadily increases. The current first flows in the main branch as indicated by the curve $I_{main}$ which increases between times t0 and t1. The current $I_{aux}$ remains zero until time t1.

When the transistor 1010 is switched into its OFF state, a fast increase in the voltage occurs at the terminals of the main branch 10 and the auxiliary branch 11. The value of the voltage is limited by the voltage surge limiter 103 indicating that the capacitor 1021 is charged.

Subsequently, driving energy is supplied to the gate control module of the power thyristor 111. This energy enables conduction to be started in the power thyristor 111. The current then commutates in the auxiliary branch 11 as indicated by the crossing of the curves $I_{main}$ and $I_{aux}$ at time t1. At this time, current $I_{main}$ becomes substantially zero and current $I_{aux}$ grows.

Synchronously the electromechanical switch-disconnectors 100 start opening.

Gradually, as the voltage increases in the capacitor 1120 of the auxiliary branch 11 and therefore across the main branch 10, a residual current flows through the voltage surge limiter 103 and therefore through the electromechanical switch-disconnectors 100.

If the residual current is too large, an electric arc will be generated across the contacts of vacuum bottles 100 during its opening operation. This could erode the bottles' contacts and this decreases their service life.

The voltage surge limiter 103 and the auxiliary voltage surge limiter 1124 are respectively rated so that, when the current $I_{aux}$ is well-established in the auxiliary branch 11, the magnitude of the residual current $I_{main}$ in the main branch 10 is substantially zero, typically much less than 1 A, so as to enable the vacuum interrupters of the electromechanical switch-disconnector 100 to open without significant electrical erosion, because of the virtual absence of electrical arcing.

The mechatronic circuit-breaker device 1 stays in this state until the contacts of the switch-disconnectors 100 are sufficiently separated from each other to support a high voltage. Meanwhile the current to be interrupted may reach values of several kilo amps.

Beyond time t2, the current is commutated into another branch (not shown or discussed in this document) connected in parallel to the main and auxiliary branches. Consequently, no current flows neither in the main branch 10 nor in the auxiliary branch 11, apart from capacitive currents and residual leakage currents caused by imperfections of the components. These currents are if necessary eliminated by conventional isolation means electrically in series with the mechatronic circuit-breaker.

Beyond time t2, currents $I_{main}$ and $I_{aux}$ are substantially zero. FIG. 3 shows curves of the voltages $U_{103}$ and $U_{1124}$ respectively in the voltage surge limiters 103 and 1124 as a function of the current.

The voltage surge limiter 103 has a sharper voltage-current characteristic and offering a much steeper slope at low currents than the surge limiter 1124.

For example, the voltage surge limiter 103 is a semiconductor component of the type "Transil diode" or of a similar type. The voltage surge limiter 1124 may be a ZnO-type component.

The idea is to use a voltage surge limiter 103 with highly nonlinear characteristics to set the voltage of the main branch 10 before opening the switch-disconnectors 100.

Thus, during this commutation sequence, the voltage required to force even a very low current through the main branch 10 is always higher than the voltage developed across the auxiliary branch 11 conducting a high current.

This avoids the commutation of current from the auxiliary branch 11 back into the main branch 10, while the value of the current can vary over a wide range and reach values of several kilo amps.

A given voltage U corresponds to a current value $I_r$ for the voltage-current characteristic of the voltage surge limiter 103 and to a current value $I_2$ for the voltage-current characteristic of the voltage surge limiter 1124. For the given voltage U, the value $I_r$ of the residual current in the vacuum bottles 100 is very low, which ensures an opening of the contacts of vacuum bottles 100 with minimum arc levels.

This avoids the appearance of excessive arc in the vacuum bottles of the electromechanical switch-disconnector 100, causing their contact to deteriorate too quickly.

The minimum voltage on the auxiliary branch 11 is sufficient to be able to perform subsequent switching into other branches that are not shown in this document.

The voltage-current characteristic $U_{103}(I_{103})$ of the voltage surge limiter 103 of the main branch 10 can be approximated, in the operating area through:

$$\frac{U_{103}}{U_{a\_p}} = alpha\_p \sqrt{\frac{I_{103}}{I_{a\_p}}}$$

For $I_{103} > 0$

And $$\frac{U_{103}}{U_{a\_n}} = -\left[alpha\_n \sqrt{\frac{-I_{103}}{I_{a\_n}}}\right]$$

For $I_{103} < 0$

Where alpha_p, alpha_n, $U_{a\_p}$, $U_{a\_n}$, $I_{a\_p}$ and $I_{a\_n}$ are positive characteristic values for the first voltage surge limiter 103.

The voltage current characteristic $U_{1124}(I_{1124})$ of the voltage surge limiter 1124 of the auxiliary branch 11 can be approximated, in the operating area through:

$$\frac{U_{1124}}{U_{b\_p}} = béta\_p \sqrt{\frac{I_{1124}}{I_{b\_p}}}$$

For $I_{1124} > 0$

And $$\frac{U_{1124}}{U_{b\_n}} = -\left[béta\_n \sqrt{\frac{-I_{1124}}{I_{b\_n}}}\right]$$

For $I_{1124} < 0$

Where béta_p, béta_n, $U_{b\_p}$, $U_{b\_n}$, $I_{b\_p}$ and $I_{b\_n}$ are positive characteristic values for the second voltage surge limiter 1124.

The constant alpha_p is greater than the constants béta_p and béta_n.

Thus, the first voltage surge limiter, used in the main branch, has a voltage-current characteristic of much steeper slope and a sharper transition at low currents than the second surge limiter.

According to different embodiments, the constants alpha_p and alpha_n can be different, as similarly and respectively for béta_p and béta_n, $U_{a\_p}$ and $U_{a\_n}$, $I_{a\_p}$ and $I_{a\_n}$, $U_{b\_p}$ and $U_{b\_n}$, $I_{b\_p}$, and $I_{b\_n}$.

According to different embodiments, the constants beta_p and beta_n could be equal, as similarly and respectively for $U_{b\_p}$ and $U_{b\_n}$, $I_{b\_p}$ and $I_{b\_n}$, as this is the case for usual $Z_nO$ surge arrestors.

According to different embodiments, the constants alpha_p and/or alpha_n are greater than 30 or greater than 50 or greater than 100.

According to different embodiments, the constants béta_p and/or béta_n are in the range of 10 to 20 or in the range of 13 to 19 or are substantially equal to 17.

What I claim is:

1. A mechatronic circuit-breaker device adapted to break an electrical current flowing through electrical power transmission means, the mechatronic circuit-breaker device comprising:
a main branch comprising at least one electromechanical switch-disconnectorconnected in series with at least one breaker cell that is electrically in parallel with a snubber and a first voltage surge limiter; and
an auxiliary branch electrically in parallel with the main branch and comprising at least one power electronic switch, connected in series with at least one capacitor, that is electrically in parallel with its discharge resistance and a second voltage surge limiter,
the first voltage surge limiter having a sharper voltage-current characteristic and a steeper slope at low currents than the second voltage surge limiter.

2. The mechatronic circuit-breaker device according to claim 1,
wherein the first voltage surge limiter has a voltage-current characteristic that is approximated, in a first operating area, with a first relation:

$$\frac{U_{103}}{U_{a\_p}} = alpha\_p \sqrt{\frac{I_{103}}{I_{a\_p}}}$$

For $I_{103} > 0$

And $$\frac{U_{103}}{U_{a\_n}} = -\left[alpha\_n \sqrt{\frac{-I_{103}}{I_{a\_n}}}\right]$$

For $I_{103} < 0$ where alpha_p, alpha_n, $U_{a\_p}$, $U_{a\_n}$, $I_{a\_p}$ and $I_{a\_n}$ are positive characteristic values for the first voltage surge limiter,
wherein the second voltage surge limiter has a voltage-current characteristic that is approximated, in a second operating area, with a second relation:

$$\frac{U_{1124}}{U_{b\_p}} = béta\_p \sqrt{\frac{I_{1124}}{I_{b\_p}}}$$

For $I_{1124} > 0$

And $$\frac{U_{1124}}{U_{b\_n}} = -\left[béta\_n \sqrt{\frac{-I_{1124}}{I_{b\_n}}}\right]$$

For $I_{1124} < 0$ where béta_p, béta_n, $U_{b\_p}$, $U_{b\_n}$, $I_{b\_p}$ and $I_{b\_n}$ are positive characteristic values for the second voltage surge limiter, and
wherein alpha _p is greater than béta_p and béta_n.

3. The mechatronic circuit-breaker device according to claim 2, wherein at least one ofalpha_p and alpha_n are greater than 30.

4. The mechatronic circuit-breaker device according to claim 2, wherein at least one of béta_p and béta_n are in a range of 10 to 20.

5. The mechatronic circuit-breaker device according to claim 2, wherein alpha_p and alpha_n have the same value.

6. The mechatronic circuit-breaker device according to claim 2 wherein alpha_p and alpha_n have different values.

7. The mechatronic circuit-breaker device according to claim 2, wherein at least one of $U_{a\_p}$ and $U_{a\_n}$ have the same value, and the constants $I_{a\_p}$ and $I_{a\_n}$ n have the same value.

8. The mechatronic circuit-breaker device according to claim 2, wherein at least one of $U_{a\_p}$ and $U_{a\_n}$ have different values and the constants $I_{a\_p}$ and $I_{a\_n}$ have different values.

9. The mechatronic circuit-breaker device according to claim 2 wherein béta_p and béta_n have the same value.

10. The mechatronic circuit-breaker device according to claim 2, wherein béta_p and béta_n have different values.

11. The mechatronic circuit-breaker device according to claim 2, wherein a least one of $U_{b\_p}$ and $U_{b\_n}$ have the same value, and the constants $I_{b\_p}$ and $I_{b\_n}$ have the same value.

12. The mechatronic circuit-breaker device according to claim 2, wherein at least one of $U_{b\_p}$ and $U_{b\_n}$ have different values, and the constants $I_{b\_p}$ and $I_{b\_n}$ have different values.

13. The mechatronic circuit-breaker device according to claim 1, wherein the first voltage surge limiter is a semiconductor component of a type of power Zener diode and the second voltage surge limiter is a ZnO-type component.

14. The mechatronic circuit-breaker device according to claim 1, wherein the first voltage surge limiter is a set of one or more semiconductor components of a type of Transil diodes and the second voltage surge limiter is a set of one or more ZnO-type components.

* * * * *